United States Patent [19]

Wells

[11] 4,126,234
[45] Nov. 21, 1978

[54] LARGE CYLINDRICAL BALE TRANSPORTER

[75] Inventor: Larry G. Wells, Lexington, Ky.

[73] Assignee: University of Kentucky Research Foundation, Lexington, Ky.

[21] Appl. No.: 810,887

[22] Filed: Jun. 28, 1977

[51] Int. Cl.² .............................................. B60P 1/04
[52] U.S. Cl. .............................. 214/1 HH; 214/766; 280/414.5
[58] Field of Search .................. 214/1 HH, 350, 351, 214/352, 144, 766, DIG. 4; 280/414.5

[56] References Cited

U.S. PATENT DOCUMENTS

| 3,935,954 | 2/1976 | Woods et al. | 214/352 |
| 3,974,926 | 8/1976 | Kopaska | 214/352 |

*Primary Examiner*—Robert G. Sheridan
*Attorney, Agent, or Firm*—Birch, Stewart, Kolasch & Birch

[57] ABSTRACT

The present application is directed to a transporter for transporting large cylindrical bales which includes a mast assembly adapted to be directly attached to a standard three-point hitch of a tractor. The transporter unit includes a two-wheel type trailer and a bale engaging assembly which is rotatably mounted upon the axle of the wheel assembly so that a load positioned on the bale engaging means may be rotated upwardly to support the load directly on the wheels of the transporter. By pivotally attaching the transporter to the mast assembly, the present invention may readily support the entire transporter above the ground to increase the maneuverability of the device when the transporter is in the unloaded condition.

10 Claims, 2 Drawing Figures

LARGE CYLINDRICAL BALE TRANSPORTER

BACKGROUND OF THE INVENTION

1. Field of the Invention

The present invention is directed to a hay bale transporter for large round bales which includes a trailer adapted to be mounted on a tractor in such a manner as to permit the pivoting and suspension of the trailer from the tractor.

2. Prior Art

It is becoming increasingly popular to employ hay balers which form relatively large, cylindrical, compact bales of hay. The large, cylindrical bales require a completely mechanized handling system, and thus will reduce the labor requirements necessary for harvesting. In addition, numerous advantages result from the use of large, cylindrical bales, for example:

1. Reduced handling costs;
2. Reduced storage costs;
3. Reduced expenses resulting from commercial transportation; and
4. Less expensive system for providing feed.

Large, cylindrical bales reduce labor requirements which would be particularly beneficial by reducing or eliminating the hiring of laborers not usually associated with the enterprise. Further, the large bales provide important flexibility with regard to the scheduling of transporting the bales from the field. Conventional bales require immediate transport to avoid significant losses. Also, they require some provisions to protect them from weathering during storage. However, the recovery of large round bales from the field can be delayed with no additional risk of loss.

The large bales discussed herein are cylindrical with a diameter and length of approximately 1.83 m (6 ft) and weighing approximately 680 kg (1500 lb). Generally, the bales are moved by means of a tractor equipped with a front-end loader or by means of several types of rear-mounted carriers. The simplest rear-mounted carrier is mounted directly on a tractor employing a standard 3-point hitch and includes a conventional hydraulic lift. Another type of transporter is semi-mounted on a tractor and requires a remote hydraulic cylinder to lift the bale.

Despite the apparent advantages of the large cylindrical bales, the adoption of this method of baling hay has been delayed by difficulties associated with handling and transporting the bales. These difficulties are particularly prevalent in farming enterprises in which a small tractor (rated at 26.1 kW (35 hp) or less) must be used in transporting the large bales.

Small tractors cannot safely transport large bales using loaders mounted directly on the 3-point hitch. Even if the capacity of the standard hydraulic lift is not exceeded, the probability of backward-tipping associated with the heaviest of such bales would be extremely high. Semi-mounted transporters which have wheels to support the bale can be used if remote hydraulic capability is available, however, such transporters are considerably more expensive.

A few devices have been designed with the specific intent of providing a two-wheel type trailer having a forklift or cradle type frame which is pivotally mounted on the axle of the trailer wheels for rotatably lifting a large cylindrical bale of hay. An example of such a device is Woods et al, U.S. Pat. No. 3,935,954, which employs a two-wheel type trailer with a forklift type frame 22 designed to receive and support a large cylindrical bale of hay 125. As disclosed in FIG. 5 of the Woods et al patent, after the forklift frame 22 engages the large cylindrical bale 125, the frame is rotated about the axle 16 by means of the master cylinder 102, the slave cylinder 104, the tongue 24 which applies a force to the links 66 thereby pulling the arm 58 which pivots the frame 22.

The patent issued to Kopaska, U.S. Pat. No. 3,974,926, discloses a baled hay transporter which includes a bale engaging unit 16 designed to be rotatably mounted about the axles 35. As shown in FIG. 4 of the Kopaska patent, by actuating the hydraulic cylinder 36 the lift arms 43 and 44 cause the entire bale engaging unit 16 to pivotally rotate about the pivot 33 and the axles 35 to support the large bale of hay 76 in the position for transportation.

Another prior art bale transporting truck is disclosed in the patent issued to Groberg, U.S. Pat. No. 3,450,281, in which a load-carrying truck or wagon bed 11 is rotatably mounted on the axles 26. The device disclosed in the Groberg patent is designed to rotate the truck or wagon bed from a horizontal position to a vertical position with the rear edge of the bed in contact with the ground thus permitting a horizontal load of bales of hay on the truck or wagon bed to be unloaded in a vertical position.

SUMMARY OF THE INVENTION

It is an object of the present invention to construct a large cylindrical bale transporter which may safely be used in conjunction with a small utility tractor without the necessity of employing remote hydraulic controls.

It is another object of the present invention to provide a transporter which is readily attached to the standard three-point hitch arrangement of a tractor.

It is a further object of the present invention to provide a transporter which is relatively simple in design and which enables the loading, transporting and unloading of large bales by a single tractor operator without requiring the operator to dismount from the tractor.

It is still a further object of the present invention to provide a transporter which may be used to lift and move other items which may be similar to geometry and weight to the bales discussed herein.

Another object of the present invention is to provide a transporter which includes a frame which is rotatably mounted on the axle of the transporter wheels so that when a bale or similar item is engaged on the frame and the frame is rotated to the transporting position, the weight of the bale is supported by the wheels of the transporter.

It is still a further object of the present invention to provide a transporter which includes a mast assembly designed to support the entire transporter to increase the maneuverability of the device when the transporter is in the unloaded condition.

These and other objects of the present invention are fulfilled by constructing a transporter which includes a mast assembly which is directly attached to a standard three-point hitch of a tractor. Pivotally attached to the mast assembly is the transporter unit which includes a two-wheel type trailer and is rotatably mounted upon the axle of the wheel assembly so that a load positioned on the trailer may be rotated upwardly to support the load directly on the wheels of the transporter. By pivotally attaching the transporter to the mast assembly, the present invention may readily support the entire transporter above the ground to increase the maneuverability of the device when the transporter is in the unloaded condition.

Further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

As discussed above, the present application relates to a semimounted transporter which may be effectively used with a small utility tractor equipped with a standard three-point hitch to transport large cylindrical bales without the necessity of an auxiliary hydraulics.

Figure 1:
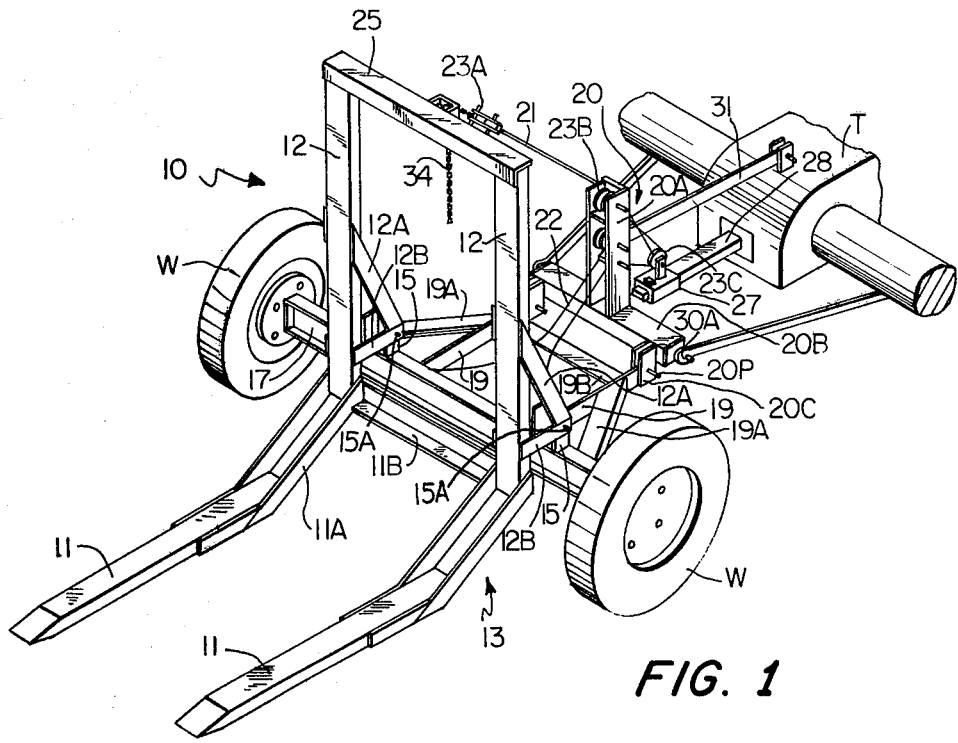
FIG. 1 is a perspective view of a preferred embodiment of the transporter unit of the present invention.

Referring to FIG. 1, two tines 11 are positioned horizontally so as to be easily inserted beneath a bale or other object positioned on the ground. The tines are rigidly joined to connecting members 11A which are in turn rigidly joined to the lower ends of the lever arms 12 to form a tine assembly, generally referred to by character 13. A transverse support 11B may be provided which is affixed to the connecting members 11A and positioned between the lower ends of the lever arms 12. The lever arms 12 include a support framework consisting of members 12A and 12B. One end of each support element 12A and 12B is rigidly affixed to the lever arms 12 and the other ends are affixed together to form a triangle with the three sides thereof formed by the lever arm 12 and the two support members 12A and 12B. The joined ends of the support members 12A and 12B are pivotally connected to the short support members 15 which extend from the axle 17 of the transporter. As shown in FIG. 1, the axle 17 is directly mounted to the wheels W and has a framework attached thereto which consists of the rigid members 19 and 19A. The tines, lever arms, axle, wheels and the framework attached to the axle comprise the transporter assembly which is generally referred to by character 10.

The transporter assembly 10 is pivotally attached to a mast assembly 20 which includes a vertical mast portion 20A, a horizontal support 20B and a frame support 20C. The frame support 20C is designed to pivotally receive the rigid members 19 and may employ a conventional pin 20P to accomplish this connection. It should be noted, that the rigid members 19 and 19A may further include a transverse frame member 19B to add additional stability to the framework attached to the axle 17. The horizontal support member 20B of the mast assembly 20 is attached to the lower lift links 30 of a conventional tractor by means of the attaching members 30A. In addition, the vertical portion of the mast 20A is also connected to the tractor T by means of the link 31. Raising or lowering the lift links 30 correspondingly raises and lowers the mast assembly 20.

Figure 2:
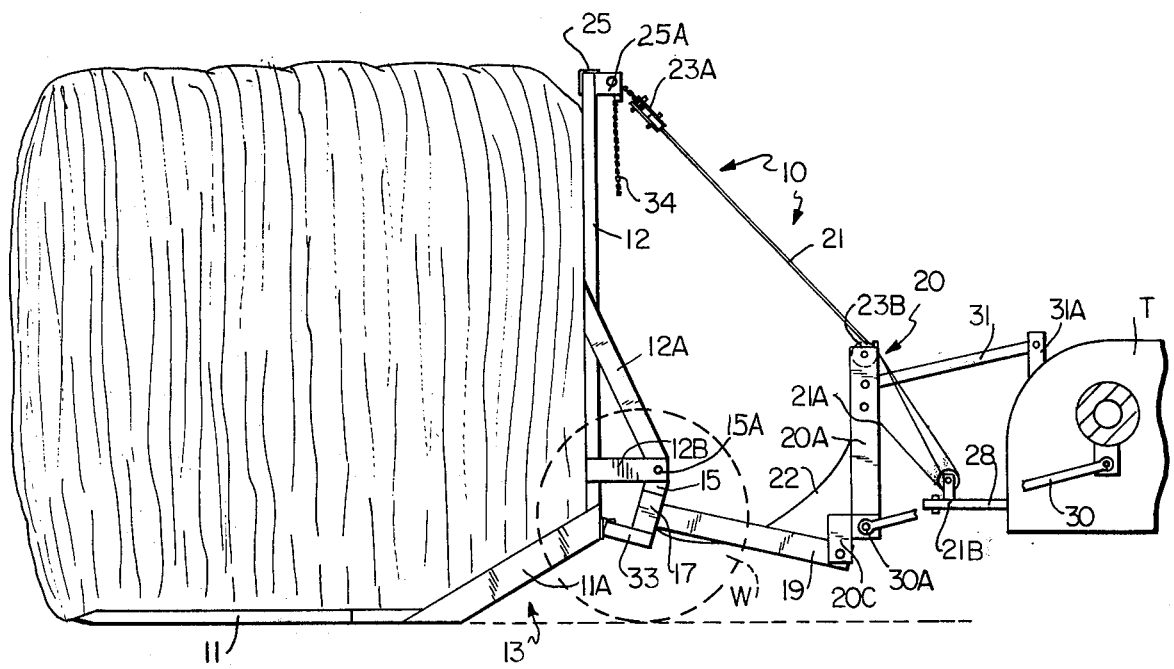
FIG. 2 is a side elevational view showing the transporter unit positioned adjacent a large cylindrical bale prior to the transporter unit being rotated to the transporting position.

The present invention further includes a flexible cable 21 which is positioned within a pulley assembly network comprising the pulley assemblies 23A, 23B and 23C. In a preferred embodiment of the present invention, one end 21A of the flexible cable 21 is affixed to the mast assembly 20 and the other end is affixed to the mounting assembly 27 which is attached to the draw bar 28 of the tractor T. As shown in FIG. 2, the flexible cable 21 begins at the one end 21A which is affixed to the mast assembly 20 and runs in the following direction: downward through the pulley assembly 23C which is rotatably mounted to the mounting assembly 27; upwardly through the pulley assembly 23B which is rotatably mounted adjacent the upper end of the vertical portion 20A of the mast assembly 20; then upwardly through the pulley assembly 23A and subsequently downwardly through the pulley assembly 23B. Finally, the flexible cable proceeds downwardly with the other end 21B affixed to the mounting assembly 27.

In addition, in a preferred embodiment of the present invention, a second flexible cable 22 is positioned in a loop between the mast assembly 20 and the wheel axle 17. Each end of the second flexible cable is affixed to the wheel axle 17 at a point below the respective connecting pins 15A with the middle portion of the flexible cable looped toward the mast assembly 20 and affixed to the vertical portion 20A.

As shown in FIG. 1, the upper ends of the lever arms 12 are connected together by means of a horizontal support brace 25. The horizontal support brace 25 includes a pulley retaining member 25A to which the pulley assembly 23A is adjustably affixed by means of the cable or chain 34. As shown in FIG. 2, the pulley retaining member 25A readily permits the adjustment of the length of the cable or chain 34. The predetermined length of the cable or chain 34 is preferred to be approximately the length as shown in FIG. 2. If the relative positioning between the pulley assembly 23A and the pulley retaining member 25A is changed by means of lengthening the cable or chain 34, this would change the positioning of the rigid members 19 when members 11 are horizontal and the flexible cable 21 is taut. This repositioning of the rigid members 19 increases the mechanical advantage of the lifting capacity of the transporter device by orientating the short support members 15 toward the vertical. In addition, the lifting capacity of the tractor T is also increased as the lifting links 30 are rotated upwardly. It has been determined that by adjusting the distance of the pulley assembly 23A relative to the pulley retaining member 25A and thereby adjusting the lower links to be substantially horizontal that a small tractor (rated at 26.1 kW (35 hp) or less) may be used to produce the necessary lifting force to rotate the large cylindrical bale to the transporting position.

It should be noted that while the effective lifting capacity of the tractor T may be increased by modifying the relative positioning of the pulley assembly 23A relative to the pulley retaining member 25A, that these modifications result in a decreased ground clearance when the large cylindrical bale is in the transporting position. Under most operating circumstances the ground clearance is adequate for transporting large cylindrical bales, regardless of the fact that the ground clearance may be decreased.

Referring in more detail to FIG. 2, the transporter unit is shown positioned adjacent a large cylindrical bale prior to the transporter unit being rotated to the transporting position. The relative positioning of the structural elements of FIG. 1 is more clearly shown in the side view illustration of FIG. 2. For example, it can be seen in FIG. 2 that the axle 17 of the transporter unit includes an outwardly projecting stopper member 33 which has one end thereof firmly affixed to the axle 17. The other end of the outwardly projecting stopper member 33 is in abutment with the lever arm 12 to prevent the arm from rotating in the counter clockwise direction. This outwardly projecting stopper member 33 is normally in engagement with the lever arms 12 when the tines 11 are in the horizontal position for loading or unloading the transporter unit. As the transporter unit is rotatably pivoted about the connecting pins 15A, the outwardly projecting stopper member 33 disengages from the lever arms 12.

In operation, with reference to FIG. 2, as the lower lifting links 30 are raised, the mast assembly 20 correspondingly is raised thereby tensioning the flexible cable 21. Upon raising the lifting links 30 and the mast assembly 20 above a certain point, the tine assembly 13 is rotated about the connecting pin 15A to thereby support the large cylindrical bale in the transporting position with the weight of the bale being on the wheels of the transporting unit. It has been found that this design readily permits the employment of a small tractor to effectively lift and subsequently transport a large cylindrical bale which weighs in the neighborhood of approximately 680 kg. (1500 lbs.). It will be readily apparent, that when the tine assembly 13 is in the unloaded condition, the lower lifting links 30 can be employed to rotate the tine assembly in the same manner as set forth above. It should be understood that when the lower lifting links 30 reach the point necessary to rotatably pivot the tine assembly about the connecting pin 15A that subsequent raising of the lower lifting links 30 will correspondingly raise the entire transporter unit so as to be positioned above the ground. The raising of the entire transporter unit 10 is effected by means of the lower lifting links 30 and the mast assembly 20 and further by means of the second flexible cable 22. As the mast assembly 20 is raised above a certain point, the flexible cable 22 will be tensioned and further raising of the mast assembly 20 will subsequently raise the transporter unit 10 above the ground. Increased maneuverability of the present invention is achieved when the transporter unit is in the raised position.

Throughout the present application, reference is made to utilizing a small tractor in connection with the present invention. It is to be understood that the present invention may be utilized by large tractors or other mechanisms which can employ a lifting force to the mast assembly 20. Further, if a small tractor is utilized in combination with the present invention, it may be desirable to employ a liquid ballast in the rear tires to add additional weight to the tractor unit.

While various proportional sizes of the members and elements utilized in the present invention are disclosed in the drawings, these proportional sizes may be readily changed to accommodate larger cylindrical bales or other articles of similar weight or size.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. An apparatus for transporting bales comprising:
   an axle for rotatably positioning ground engaging wheels;
   bale engaging means for releasably retaining a bale;
   said bale engaging means being pivotally connected to a rigid support means extending from said axle;
   a mast assembly being adapted to be connected to a three-point hitch of a tractor;
   said axle further including rigid members which are firmly affixed to the axle at one end thereof and pivotally connected to said mast assembly at the other end thereof;
   first means operatively connecting the bale engaging means to the mast assembly for pivoting the bale engaging means about a pivot point on said support means in response to raising of the mast assembly; and
   second means operatively connecting the mast assembly to said axle for lifting said ground engaging wheels above the ground in response to the raising of the mast assembly above a predetermined point.

2. An apparatus for transporting bales according to claim 1, and further including a lever arm, said bale engaging means comprises at least one tine member which is affixed to said lever arm.

3. An apparatus for transporting bales according to claim 1, wherein the first means for operatively connecting the bale engaging means to the mast assembly comprises a cable which is affixed at one end thereof to the mast assembly and is adapted to be affixed at the other end thereof to a tractor.

4. An apparatus for transporting bales according to claim 1, wherein the second means for operatively connecting the mast assembly to the axle is a cable firmly affixed between the mast assembly and the axle.

5. An apparatus for transporting bales according to claim 3, wherein the cable is connected to the bale engaging means through a pulley assembly.

6. An apparatus for transporting bales according to claim 5, wherein the pulley assembly which connects the cable to the bale engaging means is adjustable to change the mechanical advantage of the lifting mechanism.

7. An apparatus for transporting bales according to claim 1, wherein the axle further includes an outwardly projecting stopper designed to engage the bale engaging means.

8. An apparatus for transporting bales according to claim 1, wherein the mast assembly comprises a vertical portion which is adapted to be connected to one of the three-point hitches of a tractor and a horizontal portion which is adapted to be connected to the remaining two hitches of a three-point tractor hitch.

9. An apparatus for transporting bales comprising: an axle for rotatably positioning ground engaging wheels;
   said axle having rigid support members extending therefrom; bale engaging means for releasably retaining a bale;
   said bale engaging means being pivotally connected to said members extending from said axle;
   a mast assembly being adapted to be connected to a three-point hitch of a tractor;

said axle further including rigid members which are firmly affixed to the axle at one end thereof and pivotally connected to said mast assembly at the other end thereof;

first means operatively connecting the bale engaging means to the mast assembly for pivoting the bale engaging means relative to said members extending from said axle in response to raising of the mast assembly by means of said threepoint hitch; and second means operatively connecting the mast assembly to said axle for lifting said ground engaging wheels above the ground in response to the raising of the mast assembly above a predetermined point.

10. An apparatus for transporting bales according to claim 9, and further including lever arms, said bale engaging means comprises at least two tine members which are affixed to said lever arms.

* * * * *